(12) United States Patent
Onishi et al.

(10) Patent No.: US 11,315,703 B2
(45) Date of Patent: Apr. 26, 2022

(54) COIL COMPONENT

(71) Applicant: Murata Manufacturing Co., Ltd., Kyoto-fu (JP)

(72) Inventors: Koji Onishi, Nagaokakyo (JP); Takashi Murakami, Nagaokakyo (JP); Akio Igarashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 17/021,693

(22) Filed: Sep. 15, 2020

(65) Prior Publication Data

US 2021/0098148 A1      Apr. 1, 2021

(30) Foreign Application Priority Data

Oct. 1, 2019    (JP) .............................. JP2019-181285

(51) Int. Cl.
  *H01B 1/02*     (2006.01)
  *H01B 13/00*    (2006.01)
  *B23K 26/21*    (2014.01)

(52) U.S. Cl.
  CPC ......... *H01B 1/026* (2013.01); *H01B 13/0036* (2013.01); *B23K 26/21* (2015.10)

(58) Field of Classification Search
  CPC ...... H01B 1/026; H01B 13/0036; H01B 7/10; H01B 5/02; H01B 5/04; B23K 26/20; B23K 26/21; B23K 26/22; B23K 26/211; B23K 26/02; B23K 26/035; H01R 4/02; H01R 4/029; H01R 4/625; H01F 27/2828; H01F 41/10
  See application file for complete search history.

(56) References Cited

U.S. PATENT DOCUMENTS

2018/0261381 A1*  9/2018  Igarashi .................. H01F 27/32

FOREIGN PATENT DOCUMENTS

CN       107437452 A    * 12/2017    ......... H01F 27/2828
JP        4184394 B2     11/2008

OTHER PUBLICATIONS

Xiaohong Zhan, Yanqiu Zhao, Zemin Liu, Qiyu Gao, Hengchang Bu, Microstructure and porosity characteristics of 5A06 aluminum alloy joints using laser-MIG hybrid welding, Journal of Manufacturing Processes, vol. 35, 2018, pp. 437-445, ISSN 1526-6125, https://doi.org/10.1016/j.jmapro.2018.08.011. (Year: 2018).*
Translation of CN-107437452-A (Year: 2017).*

* cited by examiner

*Primary Examiner* — Timothy J Thompson
*Assistant Examiner* — John B Freal
(74) *Attorney, Agent, or Firm* — Studebaker & Brackett PC

(57) ABSTRACT

A weld nugget portion that is obtained by welding a central conductor of a wire and a receiving portion of a metal terminal is formed on the receiving portion that receives an end portion of the wire with the weld nugget portion expanding from a surface of the receiving portion along which the wire is disposed. An area ratio of a blowhole to a section of the weld nugget portion that is along an imaginary cut plane that is perpendicular to the surface of the receiving portion along which the wire is disposed is no less than 0% and no more than 8.4% (i.e., from 0% to 8.4%), preferably no less than 0% and no more than 1.3% (i.e., from 0% to 1.3%). A central axis of the central conductor of the wire in the weld nugget portion extends along the imaginary cut plane.

20 Claims, 7 Drawing Sheets

| SAMPLE | SECTION OF MELTED PORTION | BH AREA RATIO | DETERMINATION |
|---|---|---|---|
| 1 |  | 16.6% | × |
| 2 |  | 11.1% | × |
| 3 |  | 8.4% | ○ |
| 4 |  | 5.1% | ○ |
| 5 |  | 3.5% | ○ |
| 6 |  | 1.3% | ◎ |
| 7 |  | 0.6% | ◎ |
| 8 |  | 0.1% | ◎ |
| 9 |  | 0.0% | ◎ |

COIL COMPONENT

CROSS-REFERENCE TO RELATED APPLICATION

This application claims benefit of priority to Japanese Patent Application No. 2019-181285, filed Oct. 1, 2019, the entire content of which is incorporated herein by reference.

BACKGROUND

Technical Field

The present disclosure relates to a coil component, and more particularly, to a coil component that includes a wire and a metal terminal that are connected to each other by laser welding.

Background Art

An interesting technique for the present disclosure is disclosed in, for example, Japanese Patent No. 4184394. FIG. 7, FIG. 8, FIG. 9, and FIG. 10 are taken from Japanese Patent No. 4184394 and respectively correspond to FIG. 2, FIG. 3, FIG. 4, and FIG. 5 in Japanese Patent No. 4184394. FIG. 7 to FIG. 10 illustrate a flange portion 71 that is a part of a core that is included in a coil component, a metal terminal 72 that is disposed thereon, and an end portion of a wire 73 that is connected to the metal terminal 72.

As well illustrated in FIG. 7 and FIG. 10, the wire 73 includes a linear, central conductor 74 and an insulating coating 75 that covers the circumferential surface of the central conductor 74. The metal terminal 72 is formed by using a metal plate that is composed of, for example, phosphor bronze and includes a base 77 that is disposed on an outer end surface 76 of the flange portion 71 and a receiving portion 79 that extends from the base 77 across a bent portion 78 and that receives the end portion of the wire 73. As further illustrated in FIG. 7, the metal terminal 72 also includes a weld piece 81 that extends from the receiving portion 79 across a first folded portion 80 and that is welded to the central conductor 74 of the wire 73, and a holding portion 83 that extends from the receiving portion 79 across a second folded portion 82 and that holds the wire 73 for positioning.

FIG. 7 and FIG. 8 illustrate states of the weld piece 81 described above before a welding process is performed, and FIG. 9 and FIG. 10 illustrate states thereof after the welding process is performed. FIG. 9 and FIG. 10 illustrate a weld nugget portion 84 that is produced by welding. The weld nugget portion 84 is produced such that a melted metal is formed into a ball shape due to surface tension during welding and is cooled and solidified.

The welding process will now be described in detail. Before the welding process, the weld piece 81 and the holding portion 83 are not bent toward the receiving portion 79 of the metal terminal 72 and do not face the receiving portion 79. FIG. 7 illustrates a state where the holding portion 83 faces the receiving portion 79, and the weld piece 81 is not bent toward the receiving portion 79.

The wire 73 is first placed on the receiving portion 79 of the metal terminal 72. To maintain this state temporarily, the holding portion 83 is bent from the second folded portion 82 toward the receiving portion 79 such that the wire 73 is interposed between the receiving portion 79 and the holding portion 83.

Subsequently, as illustrated in FIG. 7, a portion of the insulating coating 75 of the wire 73 nearer than a portion that is interposed between the receiving portion 79 and the holding portion 83 to an end is removed. The portion of the insulating coating 75 is removed by using, for example, laser beam irradiation. As well illustrated in FIG. 7 and FIG. 10, a portion of the insulating coating 75 in contact with the receiving portion 79 is not removed and remains.

Subsequently, as illustrated in FIG. 8, the weld piece 81 is bent from the first folded portion 80 toward the receiving portion 79, and the wire 73 is interposed between the weld piece 81 and the receiving portion 79.

Subsequently, the central conductor 74 of the wire 73 and the weld piece 81 are welded to each other. More specifically, laser welding is used. The weld piece 81 that is in the state illustrated in FIG. 8 is irradiated with a laser beam, and the central conductor 74 of the wire 73 and the weld piece 81 are thereby melted. As illustrated in FIG. 9 and FIG. 10, a liquefied melted metal is formed into a ball shape due to surface tension. Consequently, the weld nugget portion 84 is formed as described above.

During the above welding process, the melted metal protrudes from the receiving portion 79 of the metal terminal 72 and reaches the bent portion 78 or the base 77 in some cases. Consequently, heat due to such excessive welding causes the metal terminal 72 to deform undesirably.

According to the technique disclosed in Japanese Patent No. 4184394, in view of this, the portion of the insulating coating 75 in contact with the receiving portion 79 is not removed and remains in order to prevent the above excessive welding as described above.

SUMMARY

It goes without saying that the strength of connection of the wire with the metal terminal is preferably high for a coil component that has a structure in which the central conductor of the wire is connected to the receiving portion of the metal terminal by laser welding as in the coil component disclosed in Japanese Patent No. 4184394 described above. However, among many products, a product that has a low strength of connection is sometimes found.

Regarding the strength of connection of the wire with the metal terminal, it can be thought that a sectional structure of the weld nugget portion needs to be scrutinized to stably guarantee high quality. High quality regarding the strength of connection can be stably guaranteed by finding out what sectional structure the weld nugget portion has when a high strength of connection is obtained, or when only a low strength of connection is obtained.

However, investigation of the sectional structure of the weld nugget portion in association with the strength of connection runs into particular difficulties as follows.

In a test that is conducted to evaluate the strength of connection, for example, the metal terminal and the wire are connected to each other by laser welding, and the wire is subsequently pulled with the metal terminal secured. At this time, there is (1) a case where the wire itself is cut, and the wire is separated from the metal terminal, and (2) a case where an inner part of the weld nugget portion is destroyed, and the wire is extracted from the metal terminal. In the case of (1), the strength of the weld nugget portion is higher than the strength of the wire, and it can be evaluated that a high strength of connection is obtained. In the other case of (2), the strength of the weld nugget portion is lower than the strength of the wire, and it can be evaluated that a sufficient strength of connection is not obtained.

The sectional structure of the weld nugget portion is subsequently observed to find the cause of the result of (1) or (2) described above. In this case, for example, the weld nugget portion is secured with resin, and the weld nugget portion is polished until a surface along the central conductor of the wire is exposed. This enables the sectional structure of the weld nugget portion to be observed. In the case of (1) describe above, there is a high possibility that the weld nugget portion maintains a state before a tensile test, the observation of the sectional structure of the weld nugget portion is meaningful. In the case of (2) described above, however, at least a part of the weld nugget portion is destroyed, and the state before the tensile test is often no longer maintained.

Accordingly, the strength of connection of the wire is not necessarily reflected on the sectional structure of the weld nugget portion after the tensile test. Naturally, the sectional structure of the weld nugget portion before the tensile test can be observed by polishing in the above manner. After polishing, however, the weld nugget portion and the wire do not maintain the original states and conducting the tensile test of the wire is meaningless.

Regarding a structure (sample A) in which the portion of the insulating coating 75 in contact with the receiving portion 79 is not removed and remains as disclosed in Japanese Patent No. 4184394, and a structure (sample B) in which an insulating coating is removed from the entire circumference of the central conductor, the present inventors conducted an experiment in which the strengths of connection of wires after laser welding were compared. In this experiment, conditions other than the presence or absence of an insulating coating such as laser welding conditions were common between the sample A and the sample B. Consequently, it was seen that the strength of connection of the wire of the sample A tended to be lower than that of the sample B.

The same problem and tendency can emerge also in the case where another welding such as arc welding, plasma welding, or resistance welding is performed in addition to the case where the laser welding is performed.

Accordingly, the present disclosure provides a condition in which a coil component that includes a wire and a metal terminal that are connected to each other by welding can stably maintain a high strength of connection of the wire.

It has been found that when welding is performed with the insulating coating of the wire remaining as described above, the area ratio of blowholes in the weld nugget portion is likely to be relatively high.

Resin of which the insulating coating of the wire is composed and impurities that adhere to, for example, the metal terminal evaporate or sublimate during welding. The blowholes are formed by gas that is produced by evaporation or sublimation at this time, that is not discharged from the weld nugget portion to the outside, and that remains in the weld nugget portion. Accordingly, there is a high possibility that the blowholes that are formed as a result of welding that is performed with the insulating coating of the wire remaining are derived from the resin of which the insulating coating of the wire is composed. For this reason, it can be presumed that the blowholes result in a decrease in the strength of connection of the wire. According to the present disclosure, the upper limit of the blowholes that enables the strength of connection of the wire to be a predetermined value or more is determined based on the presumption.

According to preferred embodiments of the present disclosure, a coil component includes a wire that includes a linear, central conductor and an insulating coating that covers a circumferential surface of the central conductor, and a metal terminal that is connected to the central conductor of the wire and that includes a receiving portion that receives an end portion of the wire. A weld nugget portion that is obtained by welding the central conductor and the receiving portion is formed on an end portion of the receiving portion in a direction in which an end of the wire is directed with the weld nugget portion expanding from a surface of the receiving portion along which the wire is disposed.

According to preferred embodiments of the present disclosure, an area ratio of a blowhole to a section of the weld nugget portion that is along an imaginary cut plane that is perpendicular to the surface of the receiving portion along which the wire is disposed is no less than 0% and no more than 8.4% (i.e., from 0% to 8.4%). A central axis of the central conductor of the wire in the weld nugget portion extends along the imaginary cut plane.

According to preferred embodiments of the present disclosure, as for a coil component that includes a wire and a metal terminal that are connected to each other by welding, a condition in which a high strength of connection of the wire can be stably maintained is that the area ratio of the blowhole is no less than 0% and no more than 8.4% (i.e., from 0% to 8.4%). Accordingly, high quality regarding the strength of connection of the wire with the metal terminal can be stably guaranteed by fulfilling the condition.

Other features, elements, characteristics and advantages of the present disclosure will become more apparent from the following detailed description of preferred embodiments of the present disclosure with reference to the attached drawings.

DETAILED DESCRIPTION

Figure 1A:
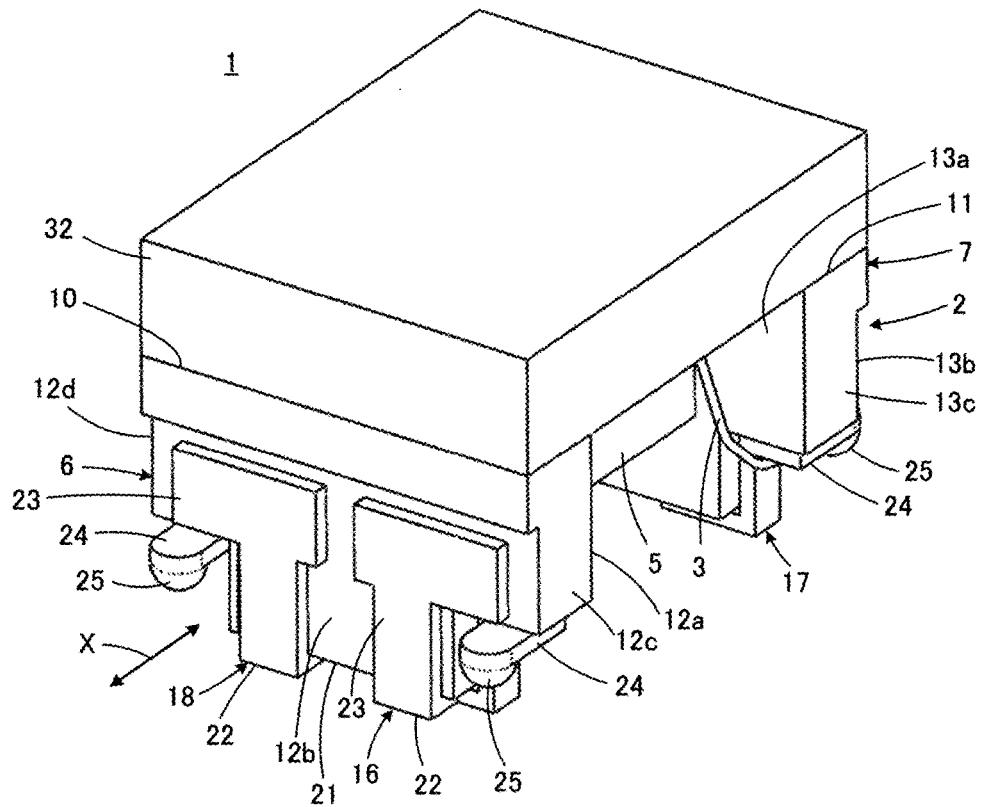
FIG. 1A is a perspective view of a coil component according to an embodiment of the present disclosure when viewed from a relatively upper position.
Figure 1B:
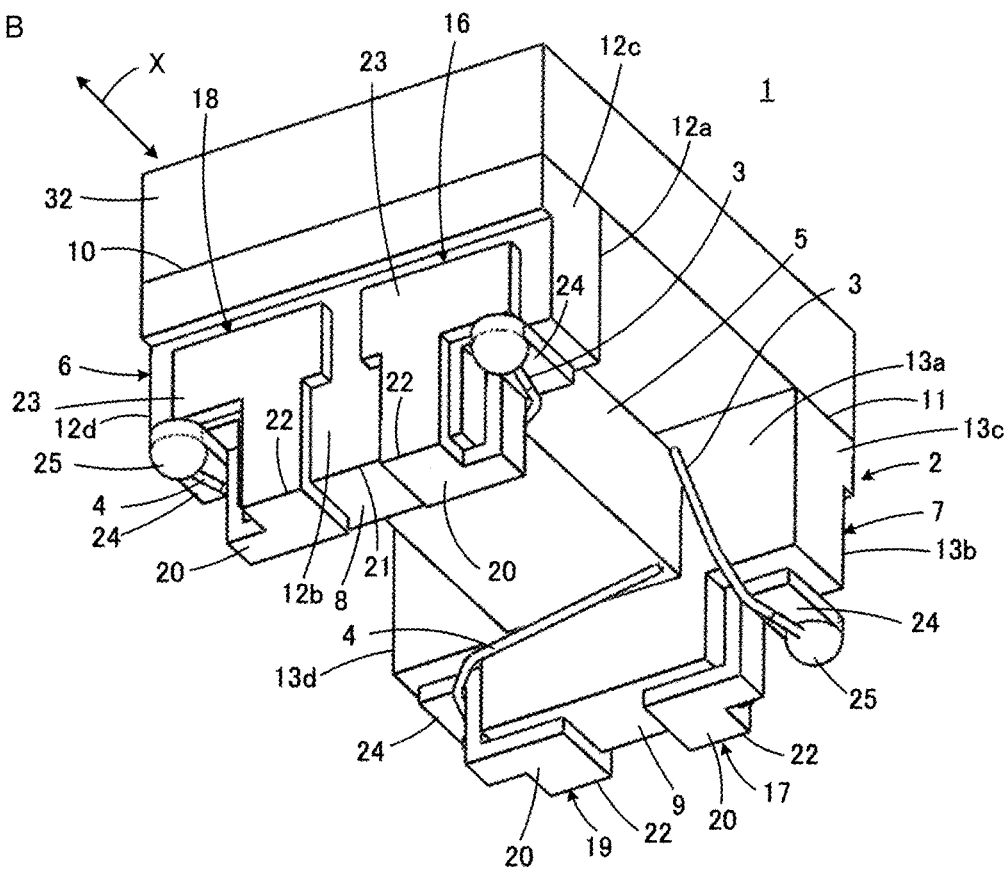
FIG. 1B is a perspective view of the coil component when viewed from a relatively lower position.

The overall structure of a coil component 1 according to an embodiment of the present disclosure will be described with reference to FIG. 1A and FIG. 1B. The coil component 1 illustrated in FIG. 1A and FIG. 1B forms, for example, a common-mode choke coil. In FIG. 1A and FIG. 1B, an illustration of principal parts of two wires of a first wire 3 and a second wire 4 is omitted.

The coil component 1 includes a drum-shaped core 2. The drum-shaped core 2 is used to dispose the first wire 3 and the second wire 4 that are wound and includes a winding core portion 5 that extends in an axial direction X, and a first flange portion 6 and a second flange portion 7 that are disposed on end portions of the winding core portion 5 that are opposite each other in the axial direction X. The drum-shaped core 2 is preferably composed of ferrite. The drum-shaped core 2 may be composed of a nonconductive material other than ferrite, for example, a non-magnetic material such as alumina, or a resin that contains ferrite powder or magnetic metal powder.

The winding core portion 5, the first flange portion 6, and the second flange portion 7 that are included in the drum-shaped core 2 have, for example, a substantially quadrangular prism shape having a substantially square sectional shape. Ridge line portions of the winding core portion 5, the first flange portion 6, and the second flange portion 7 having a substantially quadrangular prism shape are preferably round-chamfered although this is not illustrated. The sectional shape of the winding core portion 5, the first flange portion 6, and the second flange portion 7 may be another substantially polygonal shape such as a hexagon, a substantially circular shape, or a substantially ellipse shape, or a combination thereof, instead of a square.

The first flange portion 6 has a bottom surface 8 that extends in the axial direction X and that is to face a mounting substrate during mounting, and an upper surface 10 opposite the bottom surface 8. The first flange portion 6 also has an inner end surface 12a that extends upward from the bottom surface 8, that extends in the direction perpendicular to the mounting substrate, and that faces the winding core portion 5, an outer end surface 12b that extends upward from the bottom surface 8, that extends in the direction perpendicular to the mounting substrate, and that faces in the direction opposite the direction toward the winding core portion 5, and a first side surface 12c and a second side surface 12d that connect the inner end surface 12a and the outer end surface 12b to each other.

Similarly to the first flange portion 6, the second flange portion 7 has a bottom surface 9 that extends in the axial direction X and that is to face the mounting substrate during mounting, and an upper surface 11 opposite the bottom surface 9. The second flange portion 7 also has an inner end surface 13a that extends upward from the bottom surface 9, that extends in the direction perpendicular to the mounting substrate, and that faces the winding core portion 5, an outer end surface 13b that extends upward from the bottom surface 9, that extends in the direction perpendicular to the mounting substrate, and that faces in the direction opposite the direction toward the winding core portion 5, and a first side surface 13c and a second side surface 13d that connect the inner end surface 13a and the outer end surface 13b to each other.

Steps that are formed so as to protrude along upper sides of the outer end surfaces 12b and 13b of the first flange portion 6 and the second flange portion 7 are not essential features and may not be formed.

A first metal terminal 16 and a third metal terminal 18 are spaced from each other and mounted on the first flange portion 6 with an adhesive. A second metal terminal 17 and a fourth metal terminal 19 are spaced from each other and mounted on the second flange portion 7 with an adhesive. Each of the first to fourth metal terminals 16 to 19 is typically manufactured by processing a metal plate that is composed of a copper alloy such as phosphor bronze or tough pitch copper. The metal plate has a thickness of no less than 0.10 mm and no more than 0.15 mm (i.e., from 0.10 mm to 0.15 mm), for example, a thickness of about 0.1 mm.

As illustrated in FIG. 1A and FIG. 1B, each of the first metal terminal 16 and the third metal terminal 18 includes a basal portion 20 that extends along the bottom surface 8 of the first flange portion 6, and a rising portion 23 that is connected to the basal portion 20 across a bent portion 22 covering a ridge line portion 21 along which the outer end surface 12b and the bottom surface 8 of the first flange portion 6 intersect each other, and that extends along the outer end surface 12b of the first flange portion 6. Each of the first metal terminal 16 and the third metal terminal 18 also includes a receiving portion 24 that extends from the basal portion 20 and that receives an end portion of the first wire 3 or the second wire 4. It is preferable that the receiving portion 24 be slightly spaced from the drum-shaped core 2.

In FIG. 1A and FIG. 1B, the second metal terminal 17 and the fourth metal terminal 19 are partly illustrated. The first metal terminal 16 and the fourth metal terminal 19 described above have the same shape. The second metal terminal 17 and the third metal terminal 18 described above have the same shape. Accordingly, reference characters 20, 22, 23, and 24 that are used to designate the basal portion, the bent portion, the rising portion, and the receiving portion of each of the first metal terminal 16 and the third metal terminal 18 described above are also used to designate those of the second metal terminal 17 and the fourth metal terminal 19 as needed.

A first end of the first wire 3 is connected to the receiving portion 24 of the first metal terminal 16. A second end of the first wire 3 opposite the first end is connected to the receiving portion 24 of the second metal terminal 17. A first end of the second wire 4 is connected to the receiving portion 24 of the third metal terminal 18. A second end of the second wire 4 opposite the first end is connected to the receiving portion 24 of the fourth metal terminal 19. These are connected by, for example, laser welding with laser beam irradiation. Arc welding, plasma welding, or resistance welding may be used instead of laser welding. FIG. 1A and FIG. 1B illustrate weld nugget portions 25 each of which bulges into a hemispherical shape that is formed as a result of laser welding. Processes of connecting the first to fourth metal terminals 16 to 19 and the first and second wires 3 and 4 by laser welding, and the structure of each weld nugget portion 25 will be described in detail later with reference to FIG. 3A, FIG. 3B, and FIG. 4.

Figure 2:
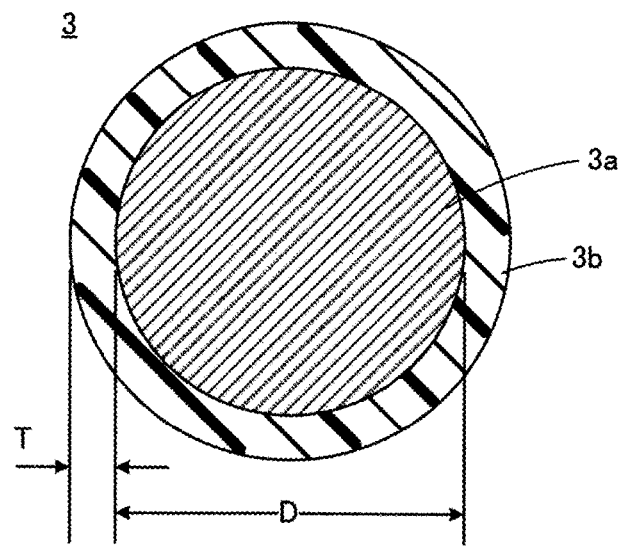
FIG. 2 is an enlarged sectional view of a first wire that is included in the coil component illustrated in FIG. 1A and FIG. 1B.

FIG. 2 is an enlarged sectional view of the first wire 3 that is included in the coil component 1. The first wire 3 and the second wire 4 have substantially the same sectional shape. The first wire 3 illustrated in FIG. 2 will now be described, but a description of the second wire 4 is omitted.

As illustrated in FIG. 2, the first wire 3 typically has a substantially circular sectional shape and includes a linear, central conductor 3a and an insulating coating 3b that covers the circumferential surface of the central conductor 3a and that is composed of an electrically insulating resin. The diameter D of the central conductor 3a is, for example, no less than 28 μm and no more than 50 μm (i.e., from 28 μm to 50 μm). The thickness T of the insulating coating 3b is, for example, no less than 3 μm and no more than 6 μm (i.e., from 3 μm to 6 μm). The central conductor 3a is composed of, for example, good conductive metal such as copper. The insulating coating 3b is preferably composed of a resin that contains an imide linkage.

The first wire 3 and the second wire 4 are spirally wound around the winding core portion 5 in the same direction although an illustration thereof is omitted in FIG. 1A and FIG. 1B. More specifically, the first wire 3 and the second wire 4 may be wound so as to form two layers such that the first wire 3 or the second wire 4 is wound inside, and the other is wound outside, or may be wound so as to form a single layer such that the turns of each wire are alternately arranged in the axial direction X of the winding core portion 5 and are parallel with each other. The two wires of the first wire 3 and the second wire 4 may be simultaneously wound in a bifilar winding manner. The two wires of the first wire 3 and the second wire 4 may be twisted together and wound.

After a process of winding the first wire 3 and the second wire 4 is finished, the processes of connecting the first and second wires 3 and 4 and the first to fourth metal terminals 16 to 19 are performed as described below.

Figure 3A:
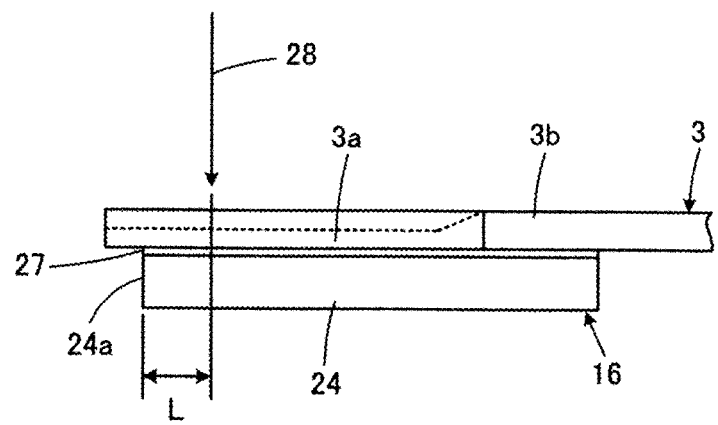
FIG. 3A and FIG. 3B schematically illustrate a laser welding process of electrically connecting the first wire to a first metal terminal in the coil component illustrated in FIG. 1A and FIG. 1B.
Figure 3B:
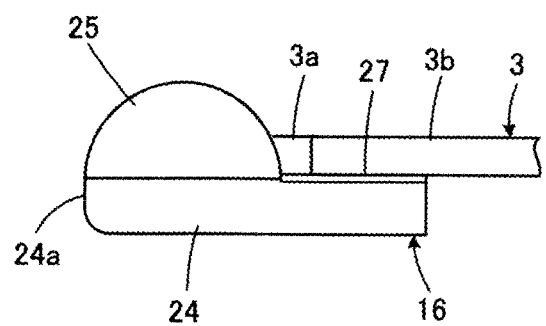

The process of connecting the first wire 3 to the first metal terminal 16 will now be representatively described with reference to FIG. 3A and FIG. 3B. Accordingly, in the following description, the "first wire" is referred to simply as the "wire", and the "first metal terminal" is referred to simply as the "metal terminal". FIG. 3A and FIG. 3B schematically illustrate the receiving portion 24 of the metal terminal 16 and the end portion of the wire 3. In FIG. 3A and FIG. 3B, a laser beam 28 is illustrated so as to be radiated from above to below. This relationship in the vertical direction is opposite to that in FIG. 1A and FIG. 1B.

Right after the above winding process is finished, as illustrated in FIG. 3A, the end portion of the wire 3 is located on the receiving portion 24. At this time, the wire 3 extends across an end 24a of a portion of the receiving portion 24 that is located near the end of the wire 3 in the longitudinal direction and that is to be irradiated with the laser beam 28.

The material of the metal terminal 16 is composed of, for example, phosphor bronze. For example, a nickel film having a thickness of 2 μm or less is formed by nickel plating. In particular, a tin-containing film 27 that contains tin is preferably disposed on a surface of the receiving portion 24 along which the end portion of the wire 3 is disposed. The tin-containing film 27 has a thickness of, for example, no less than 0.5 μm and no more than 20 μm (i.e., from 0.5 μm to 20 μm), preferably a thickness of 10 μm or less. The tin-containing film 27 is preferably formed by tin plating on a first main surface of the metal plate that corresponds to the material of the metal terminal 16. The reason is that the tin-containing film 27 can be efficiently disposed on the receiving portion 24 while being prevented from containing impurities. The tin-containing film 27 is not limited to plating but may be formed by attaching tin foil.

As illustrated in FIG. 3A, a portion of the insulating coating 3b on the entire circumference of the end portion of the wire 3 is removed. The portion of the insulating coating 3b is removed by using, for example, laser beam irradiation.

Subsequently, thermo-compression bonding of an end portion of the central conductor 3a of the wire 3 to the tin-containing film 27 is performed. Consequently, as illustrated by a dashed line in FIG. 3A, it is preferable that the end portion of the central conductor 3a of the wire 3 be flattened into an oblong shape, and that the end portion of the central conductor 3a of the wire 3 be temporarily secured to the metal terminal 16 by melting the tin-containing film 27. At this time, the tin-containing film 27 is melted once, but the presence of the tin-containing film 27 is maintained, and the end portion of the wire 3 is brought into contact with the tin-containing film 27 such that the major axis direction of a section of the oblong shape is along a surface of the tin-containing film 27. This structure enables the end portion of the central conductor 3a of the wire 3 and the receiving portion 24 to be brought into close contact with each other, and a contact area therebetween can be relatively wide. Accordingly, in the welding process described later, heat that causes the receiving portion 24 to melt is rapidly conducted to the central conductor 3a of the wire 3, and this helps finishing welding in a decreased time.

According to the embodiment, the end portion of the central conductor 3a of the wire 3 and the receiving portion 24 are preferably, but not necessarily, brought into close contact with each other. When the receiving portion 24 and the end portion of the central conductor 3a of the wire 3 are partly in contact with each other, the heat that causes the receiving portion 24 to melt is conducted to the wire 3, and welding can be finished in a decreased time.

Subsequently, as illustrated in FIG. 3A again, the laser beam 28 for welding is radiated with the end portion of the central conductor 3a of the wire 3 disposed along the receiving portion 24. The central conductor 3a of the wire 3 that is disposed above the receiving portion 24 can also be irradiated with the laser beam 28. If anything, it is important for the tin-containing film 27 on the receiving portion 24 to be irradiated. The reason is that the tin-containing film 27 has a higher efficiency of absorption of the laser beam 28 than that of the central conductor 3a that is composed of, for example, copper, the temperature more rapidly reaches the melting temperature of tin, and liquified tin further increases the efficiency of absorption of the laser beam 28.

After the tin is liquified and the efficiency of absorption of the laser beam 28 is further increased as above, the base material of the receiving portion 24 such as phosphor bronze is readily melted. Consequently, as illustrated in FIG. 3B, the central conductor 3a can be welded to the receiving portion 24 in a short time. At this time, the melted central conductor 3a and the melted receiving portion 24 are formed into a ball shape due to surface tension acting thereon, and the weld nugget portion 25 is formed. The weld nugget portion 25 is integrally formed by welding the central conductor 3a and the receiving portion 24. The central conductor 3a is contained in the weld nugget portion 25. Such welding is preferably finished while a thermo-compression bonding state of the central conductor 3a and the receiving portion 24 described above is maintained.

As illustrated in FIG. 3A, the laser beam 28 described above is radiated to a position (position of the center of irradiation spot) a length L away from the end 24a of the receiving portion 24 inward in the direction in which the end of the wire 3 is directed. The length L is preferably no less than 0.15 mm and no more than 0.25 mm (i.e., from 0.15 mm to 0.25 mm). The position to which the laser beam 28 is radiated is selected in this way. Consequently, while the position to which the laser beam 28 is radiated is fixed, melted portions of the receiving portion 24 and the central conductor 3a of the wire 3 move toward low temperature regions (right-hand direction in FIG. 3A and FIG. 3B), a blowhole is inhibited from occurring, and the weld nugget portion 25 is formed.

It is known that the above effect of inhibiting a blowhole from occurring is likely to be achieved particularly when the material of the metal terminal 16 is composed of phosphor bronze.

Conditions of irradiation of the laser beam 28 include pulse irradiation with, for example, a YAG laser, a plus width of no less than 1.0 ms and no more than 10.0 ms (i.e., from 1.0 ms to 10.0 ms), a wave length of 1064 nm, and a peak power of no less than 0.5 kW and no more than 2.0 kW (i.e., from 0.5 kW to 2.0 kW). A time up to the peak power is 1 ms. The laser beam 28 is preferably radiated in the direction perpendicular to the surface of the receiving portion 24, more particularly, the surface of the tin-containing film 27 but may be inclined about ±10 degrees with respect to the perpendicular direction.

It is preferable that the receiving portion 24 be slightly spaced from the drum-shaped core 2 as described above. This structure is not essential. With this structure, however, the increased temperature of the receiving portion 24 is unlikely to be conducted to the drum-shaped core 2 in the above welding process, and an adverse effect on the drum-shaped core 2 due to the heat can be reduced.

Figure 4:
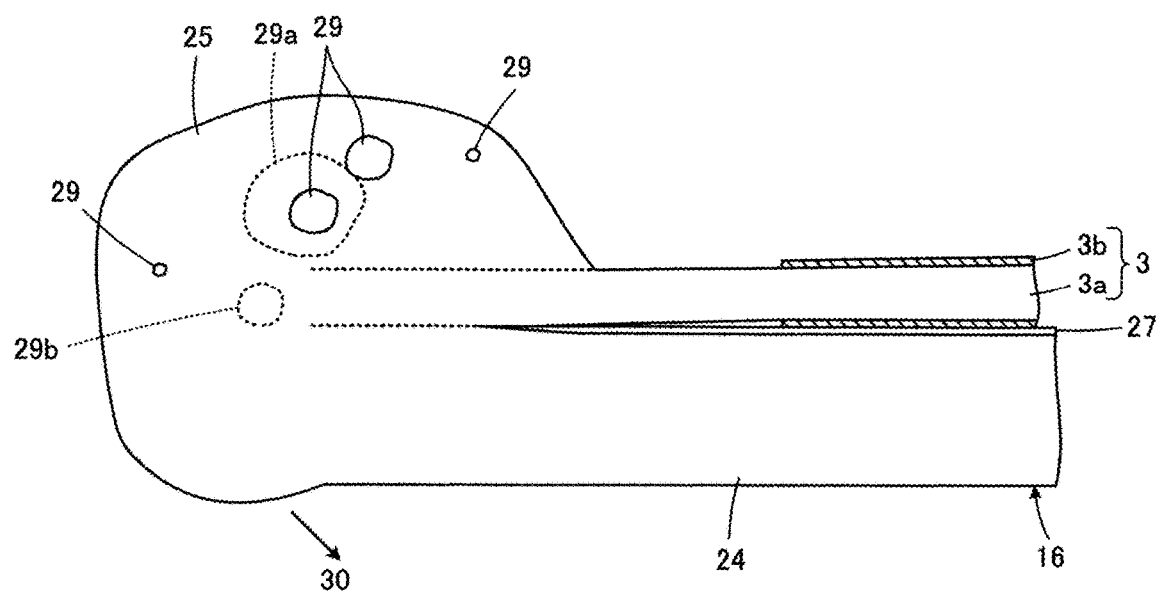
FIG. 4 schematically illustrates an enlarged view of a section of a contact between the first wire and the first metal terminal that is obtained in the welding process illustrated in FIG. 3A and FIG. 3B.

FIG. 4 schematically illustrates an enlarged view of a section of the contact between the wire 3 and the metal terminal 16 that is obtained in the welding process illustrated in FIG. 3A and FIG. 3B. In FIG. 4, the relationship in the vertical direction is opposite to that in FIG. 1A and FIG. 1B as in FIG. 3A and FIG. 3B.

Referring to FIG. 4, as a result of the welding process, the weld nugget portion 25 and the receiving portion 24 that remains after welding are welded to each other and integrally formed. The central conductor 3a of the wire 3 is located between the receiving portion 24 and the weld nugget portion 25 and contained in the weld nugget portion 25. The weld nugget portion 25 is integrally formed by welding the central conductor 3a and the receiving portion 24 and protrudes from the surface of the receiving portion 24 along which the end portion of the wire 3 is disposed, that is, the surface on which the tin-containing film 27 is disposed.

FIG. 4 illustrates a section of the weld nugget portion 25 along an imaginary cut plane that is perpendicular to the surface of the receiving portion 24 along which the central conductor 3a of the wire 3 is disposed, where the central axis of the central conductor 3a of the wire 3 extends along the imaginary cut plane. As illustrated in FIG. 4, blowholes 29 are generated in the weld nugget portion 25 in some cases. Resin of which the insulating coating 3b of the wire 3 is composed and impurities that adhere to, for example, the metal terminal 16 evaporate or sublimate during laser welding as described above. The blowholes 29 are formed by gas that is produced by evaporation or sublimation at this time, that is not discharged from the weld nugget portion 25 to the outside, and that remains in the weld nugget portion 25.

According to the present embodiment, the area ratio of the blowholes 29 to the section illustrated in FIG. 4, more accurately, the area ratio regarding the total area of the blowholes 29 is no less than 0% and no more than 8.4% (i.e., from 0% to 8.4%), preferably no less than 0% and no more than 1.3% (i.e., from 0% to 1.3%).

In this case, from the perspective of improvement in the strength of connection of the wire 3 with the metal terminal 16, it is preferable that there be no blowholes having a diameter equal to or larger than the diameter of the central conductor 3a of the wire 3 such as a blowhole 29a illustrated by a dashed line. In other words, the diameters of all of the blowholes 29 in the above section are preferably smaller than the diameter of the central conductor 3a of the wire 3.

A blowhole 29b illustrated by a dashed line is located on an extension line of a portion at which there used to be the central conductor 3a of the wire 3. From the perspective of improvement in the strength of connection of the wire 3 with the metal terminal 16, however, it is preferable that the blowhole 29b be located neither in the portion at which there used to be the central conductor 3a of the wire 3 nor on the extension line thereof.

Connection between the first metal terminal 16 and the first wire 3 is described above. The same processes are performed for connecting the other metal terminals 17 to 19 and the first wire 3 or the second wire 4, and the same connection structures are obtained.

After the above process of winding the first wire 3 and the second wire 4, and the processes of connecting the first and second wires 3 and 4 to the first to fourth metal terminals 16 to 19, as illustrated in FIG. 1A and FIG. 1B, a plate core 32 that is composed of, for example, ferrite is joined to the upper surfaces 10 and 11 of the first flange portion 6 and the second flange portion 7 with an adhesive. In this way, the drum-shaped core 2 and the plate core 32 forms a closed magnetic circuit, and accordingly, the inductance value can be improved.

The plate core 32 may be replaced with a magnetic resin plate or a metal plate that can form a magnetic circuit. The coil component 1 may not include the plate core 32.

Figure 5:
FIG. 5 illustrates pictures of sections of welded portions of some samples that are obtained in experimental examples that are conducted according to the present disclosure and measured area ratios of blowholes (BH)
Figure 5:
Figure 5:
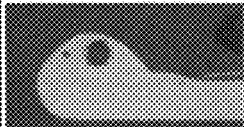
Figure 5:
Figure 5:
Figure 5:
Figure 5:
Figure 5:
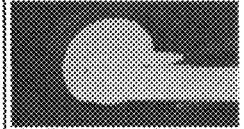
Figure 5:
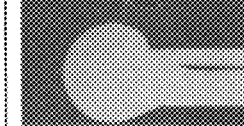
Figure 6:
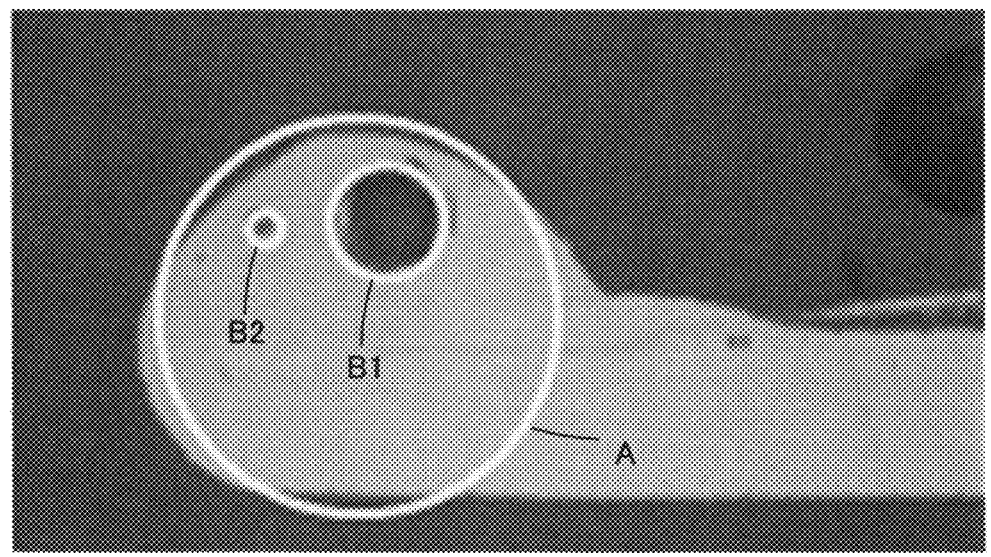
FIG. 6 illustrates a weld nugget portion of sample 3 illustrated in FIG. 5 by way of example, and a method of obtaining the area ratio of blowholes in the weld nugget portion.
Figure 7:
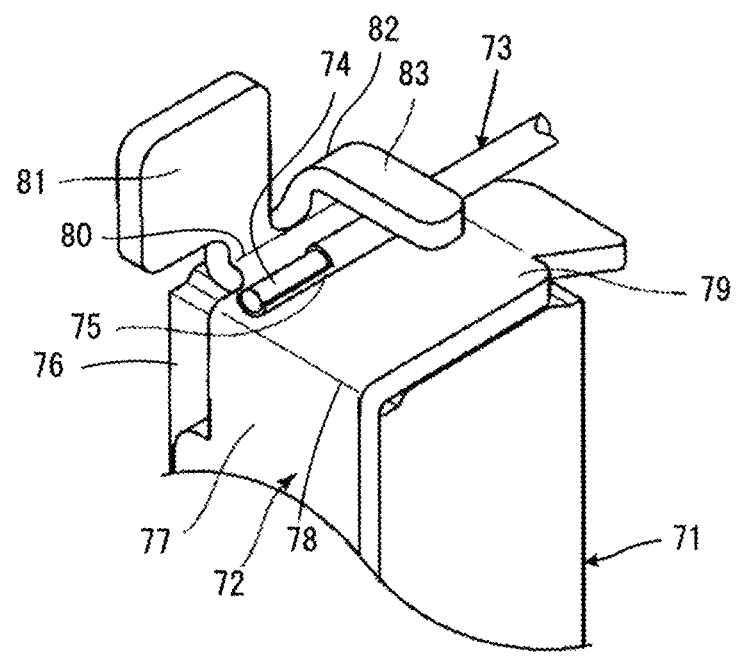
FIG. 7 is a perspective view of a flange portion of a core that is included in a coil component disclosed in Japanese Patent No. 4184394, a metal terminal that is disposed thereon, and a wire that is connected to the metal terminal and illustrates a state before welding where the wire is interposed between a receiving portion and a holding portion and temporarily secured, and a weld piece is not bent toward the receiving portion.
Figure 8:
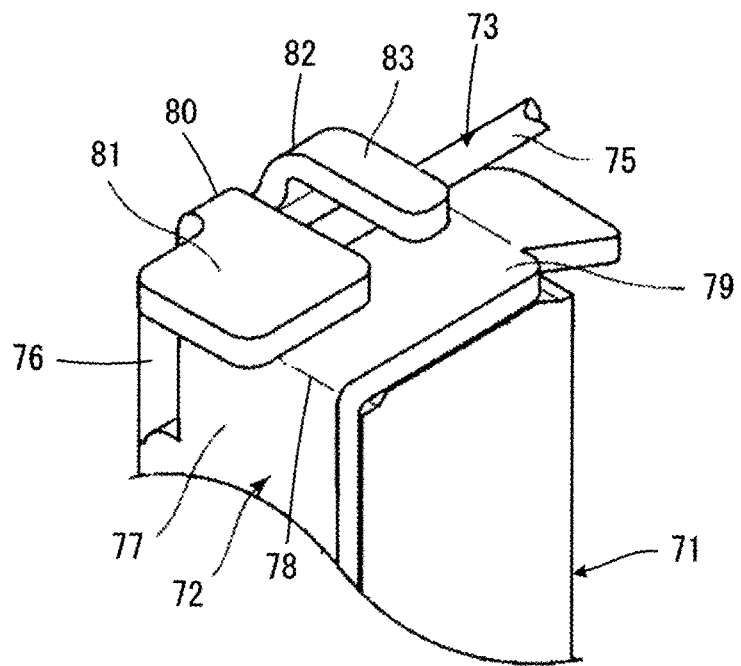
FIG. 8 is a perspective view corresponding to FIG. 7 and illustrates a state before welding where the weld piece is bent from a first folded portion toward the receiving portion in the state illustrated in FIG. 7, and the wire is interposed between the weld piece and the receiving portion.
Figure 9:
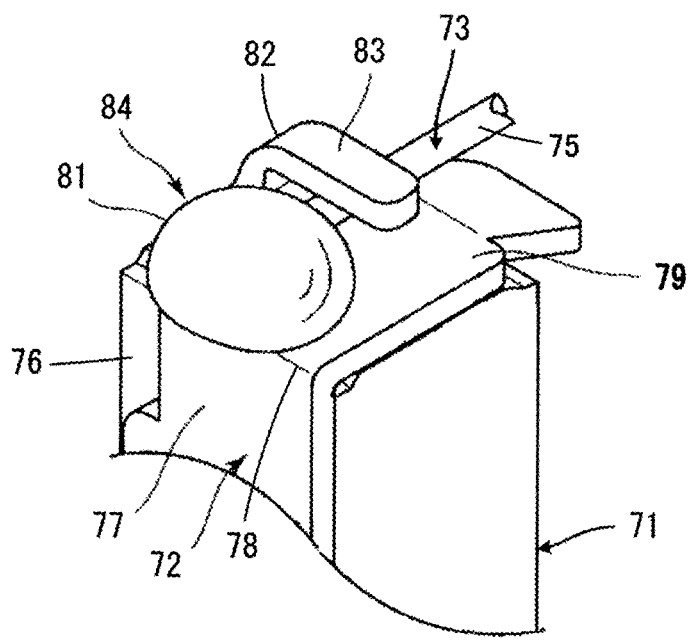
FIG. 9 corresponds to FIG. 7 and illustrates a state where the weld piece is irradiated with a laser beam in the state illustrated in FIG. 8, a central conductor of the wire and the weld piece have been welded to each other.
Figure 10:
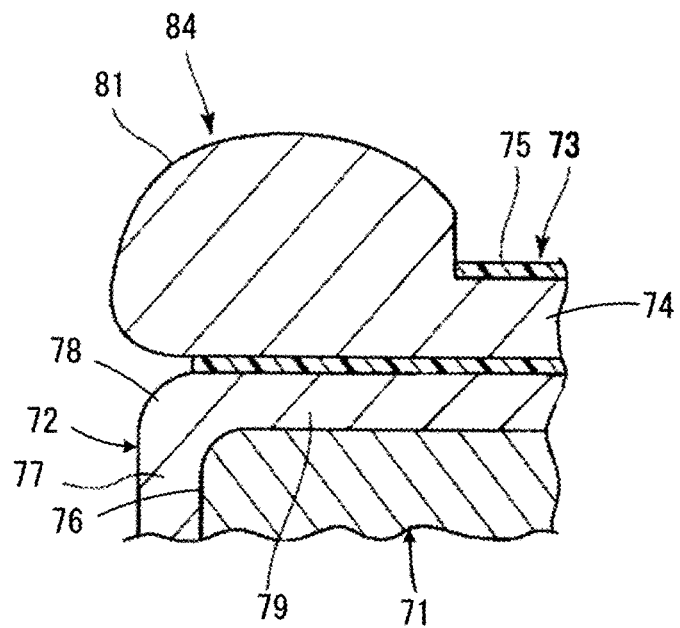
FIG. 10 is an enlarged sectional view of a welded portion illustrated in FIG. 9.

FIG. 5 illustrates pictures of sections of welded portions of samples 1 to 9 that were obtained in experimental examples that were conducted according to the present disclosure, area ratios of blowholes (BH), and the results of determination. The determination is made to evaluate the strength of connection of each wire in three stages, and "⊙" represents that the result of evaluation is very good, "○" represents that the result of evaluation is good, and "x" represents that the result of evaluation is not good. FIG. 6 illustrates a weld nugget portion of sample 3 illustrated in FIG. 5 by way of example, and a method of obtaining the area ratio of blowholes in the weld nugget portion.

The pictures illustrated in FIG. 5 and FIG. 6 were obtained in a manner in which each welded portion was secured with resin by using "EpoFix cold-mounting resin" and "EpoFix Hardener" manufactured by Marumoto Struers K.K., and after polishing was performed by using a metal sample surfacing apparatus "EcoMet•AutoMet 350" manufactured by Buehler Ltd., until a surface of the weld nugget portion along the central conductor of the wire was exposed, a section of the weld nugget portion was photographed by using an optical microscope "Digital Microscope VHX-6000" manufactured by KEYENCE CORPORATION.

More specifically, to obtain the area ratio of the blowholes in the weld nugget portion, imaginary circles A, B1, and B2 that were drawn by selecting three points along each contour of the weld nugget portion and the blowholes were determined by using a circular section area measurement function of the optical microscope "Digital Microscope VHX-6000" manufactured by KEYENCE CORPORATION described above. As illustrated in FIG. 6, the area ratio of the blowholes in the weld nugget portion was obtained from the area of the imaginary circle A passing through the contour of the weld nugget portion and the areas of the imaginary circles B1 and B2 passing through the contours of the blowholes in accordance with an expression of {(the sum of the areas of the circles B1 and B2, . . . )/(the area of the circle A)}×100 [%].

As illustrated in FIG. 5, it is demonstrated that control of the conditions of irradiation of the laser beam enables weld nugget portions that have various values of a blowhole area ratio (BH area ratio) to be obtained.

Regarding samples that were obtained by welding in the same conditions of irradiation of the laser beam as the samples 3 to 9 having a BH area ratio of no less than 0% and no more than 8.4% (i.e., from 0% to 8.4%) and that corresponded to the samples 3 to 9, tests in which wires that were connected to metal terminals were pulled were conducted. Consequently, regarding 90% or more of the samples, the wires themselves, including central conductors having a diameter of about 0.03 mm, were cut, and it was confirmed that the strength of connection of each wire was high. Accordingly, the result of evaluation is "⊚" or "○".

In addition, regarding samples that were obtained by welding in the same conditions of irradiation of the laser beam as the samples 6 to 9 having a BH area ratio of no less than 0% and no more than 1.3% (i.e., from 0% to 1.3%) and that corresponded to the samples 6 to 9, tensile tests of wires were conducted. Consequently, regarding 100% of the samples, the wires themselves, including central conductors having a diameter of about 0.03 mm, were cut, and it was confirmed that the strength of connection of each wire was higher than those of the other samples. Accordingly, the result of evaluation is "⊚".

In addition, regarding samples that were obtained by welding in the same conditions of irradiation of the laser beam as the samples 1 and 2 having a BH area ratio of more than 8.4% and that corresponded to the samples 1 and 2, tensile tests of wires were conducted. Consequently, regarding 50% or more of the samples, inner parts of weld nugget portions were destroyed, and the wires were separated from metal terminals. It was confirmed from this that the strength of connection of each wire was low. Accordingly, the result of evaluation is "x".

As seen from the above experimental examples, the blowhole area ratio is closely related to the strength of connection of a wire, and it is important for the blowhole area ratio to be a predetermined value or less to obtain a high strength of connection of the wire. For this reason, it can be said that the present disclosure is very meaningful from the perspective that the present disclosure provides a condition in which a high strength of connection of the wire can be stably maintained regarding the blowhole area ratio.

Accordingly, the present disclosure is put to practical use in the following procedures. While laser welding conditions are changed in various ways, various samples that have different internal structures of weld nugget portions are manufactured. The laser welding conditions that are used are recorded. Subsequently, sections of the weld nugget portions of the samples are observed, and the area ratios of blowholes are obtained. A sample that consequently fulfills a condition of an area ratio of 8.4% or less, preferably 1.3% or less is selected. Among the above recorded laser welding conditions, a laser welding condition that is used to obtain the sample that fulfills the above condition of the area ratio is selected.

The laser welding condition in which the area ratio of the blowholes becomes 0% is strict, and this needs precise control. Accordingly, to improve mass productivity, the area ratio of the blowholes is not aimed to be 0%, but a condition of 0% or more, more preferably 0.1% or more is preferably used for production.

A coil component according to the present disclosure is described above on the basis of the embodiment of the common-mode choke coil. The embodiment is described by way of example and can be used for another coil component such as an inductor, a transformer, or a balun.

The number of the wires included in the coil component, the winding direction of the wires, and the number of the metal terminals, for example, can be changed in accordance with the function of the coil component.

A coil component according to the present disclosure may include no core such as the drum-shaped core.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:
a wire that includes a linear, central conductor and an insulating coating that covers a circumferential surface of the central conductor; and
a metal terminal that is connected to the central conductor of the wire and that includes a receiving portion that receives an end portion of the wire, and a weld nugget portion that is obtained by welding the central conductor and the receiving portion being configured on an end portion of the receiving portion in a direction in which an end of the wire is directed with the weld nugget portion expanding from a surface of the receiving portion along which the wire is disposed, wherein
an area ratio of a blowhole to a section of the weld nugget portion that is along an imaginary cut plane that is perpendicular to the surface of the receiving portion along which the wire is disposed is from 0% to 8.4%, and a central axis of the central conductor of the wire in the weld nugget portion extends along the imaginary cut plane, and
the metal terminal is composed of a copper alloy.

2. The coil component according to claim 1, wherein the area ratio is from 0% to 1.3%.

3. The coil component according to claim 1, wherein a diameter of the blowhole in the section is smaller than a diameter of the central conductor of the wire.

4. The coil component according to claim 1, wherein there is no blowhole on an extension line of the wire in the section of the weld nugget portion.

5. The coil component according to claim 1, wherein the metal terminal is composed of phosphor bronze.

6. The coil component according to claim 1, further comprising:
a core that includes a winding core portion and a flange portion that is disposed on an end portion of the winding core portion, wherein
the wire is spirally wound around the winding core portion, and
the metal terminal is mounted on the flange portion.

7. The coil component according to claim 2, wherein a diameter of the blowhole in the section is smaller than a diameter of the central conductor of the wire.

8. The coil component according to claim 2, wherein there is no blowhole on an extension line of the wire in the section of the weld nugget portion.

9. The coil component according to claim 3, wherein there is no blowhole on an extension line of the wire in the section of the weld nugget portion.

10. The coil component according to claim 7, wherein there is no blowhole on an extension line of the wire in the section of the weld nugget portion.

11. The coil component according to claim 2, wherein the metal terminal is composed of phosphor bronze.

12. The coil component according to claim 3, wherein the metal terminal is composed of phosphor bronze.

13. The coil component according to claim 4, wherein the metal terminal is composed of phosphor bronze.

14. The coil component according to claim 7, wherein the metal terminal is composed of phosphor bronze.

15. The coil component according to claim 8, wherein the metal terminal is composed of phosphor bronze.

16. The coil component according to claim 9, wherein the metal terminal is composed of phosphor bronze.

17. The coil component according to claim 2, further comprising:
   a core that includes a winding core portion and a flange portion that is disposed on an end portion of the winding core portion, wherein
   the wire is spirally wound around the winding core portion, and
   the metal terminal is mounted on the flange portion.

18. The coil component according to claim 3, further comprising:
   a core that includes a winding core portion and a flange portion that is disposed on an end portion of the winding core portion, wherein
   the wire is spirally wound around the winding core portion, and
   the metal terminal is mounted on the flange portion.

19. The coil component according to claim 4, further comprising:
   a core that includes a winding core portion and a flange portion that is disposed on an end portion of the winding core portion, wherein
   the wire is spirally wound around the winding core portion, and
   the metal terminal is mounted on the flange portion.

20. The coil component according to claim 5, further comprising:
   a core that includes a winding core portion and a flange portion that is disposed on an end portion of the winding core portion, wherein
   the wire is spirally wound around the winding core portion, and
   the metal terminal is mounted on the flange portion.

* * * * *